United States Patent [19]
Guthrie

[11] Patent Number: 5,973,732
[45] Date of Patent: Oct. 26, 1999

[54] OBJECT TRACKING SYSTEM FOR MONITORING A CONTROLLED SPACE

[76] Inventor: Thomas C. Guthrie, 6 Hoffman Rd., Mendham, N.J. 07945

[21] Appl. No.: 08/802,615

[22] Filed: Feb. 19, 1997

[51] Int. Cl.$^6$ .................................................. H04N 5/225
[52] U.S. Cl. .......................................... 348/169; 348/150
[58] Field of Search ................................. 348/169, 170, 348/171, 172, 142, 143, 149, 150, 153, 155, 218; 382/155; 342/159; H04N 5/225

[56] References Cited

U.S. PATENT DOCUMENTS

| | | | |
|---|---|---|---|
| 5,097,328 | 3/1992 | Boyette | 348/150 |
| 5,243,418 | 9/1993 | Kuno et al. | 348/155 |
| 5,305,390 | 4/1994 | Frey et al. | 382/155 |
| 5,465,115 | 11/1995 | Conrad et al. | 348/155 |
| 5,587,929 | 12/1996 | League et al. | 342/159 |
| 5,666,157 | 9/1997 | Aviv | 348/150 |
| 5,764,283 | 6/1998 | Pingali et al. | 348/169 |

*Primary Examiner*—Tommy P. Chin
*Assistant Examiner*—Gims S. Philippe
*Attorney, Agent, or Firm*—Craig J. Lervick

[57] ABSTRACT

An object tracking system used for monitoring objects as they traverse a controlled space provides for efficient processing and creates a "database output" which includes the direction each object has traveled along with an identification of the specific time at which this object was counted. The system provides for efficient processing through pixel blocking and the use of a crop box to minimize the analysis required.

20 Claims, 7 Drawing Sheets

OBJECT TRACKING SYSTEM FOR MONITORING A CONTROLLED SPACE

BACKGROUND OF THE INVENTION

The present invention relates to a system for monitoring and tracking objects as they traverse a predefined space. More specifically, the invention relates to a system which tracks people as they traverse a controlled space such as the entrance to a retail outlet.

In certain situations, it is extremely beneficial to keep track of objects and people as they traverse a controlled space. For example, in retail sales, it is beneficial to monitor customers as they enter the retail establishment. This information can then be used for purposes of staffing, marketing, etc.

Certain physical apparatus can be used to monitor individuals entering or traversing a controlled space. For example, a turnstile is commonly used to count people as they enter certain areas such as amusement parks, subways, athletic events, etc. Other processes are also used such as the use of infrared beams or motion detectors. In each of these systems, the object must interfere with the device in some way so as to produce a countable event.

Other systems have been used which utilize video cameras and processing devices for tracking objects and individuals. Some example devices are shown in U.S. Pat. No. 5,243,418 entitled "Display Monitoring System for Detecting and Tracking an Intruder in a Monitor Area". This system, however, provides a very complex method of tracking—not counting—in which reference frames are constantly changed and large amounts of processing are required.

Another system is disclosed in U.S. Pat. No. 5,097,328 which discloses a system for detecting and monitoring an area. This system uses a combination of blob analysis and motion analysis to determine if customers are present at a predefined location. More specifically, this system is tailored to monitor customer service windows at a bank.

Another system is disclosed in U.S. Pat. No. 5,465,115 entitled "Video Traffic Monitor for Retail Establishments and the Like". This system is also for monitoring the flow of traffic through a designated area. In this system, an imaginary row of gates is defined and images filling one or more of these gates are monitored. The gates are used as a turnstile and are much smaller than a person.

All of the above mentioned systems utilize classical video cameras to acquire their images. These video cameras, while being effective, are very large and require significant amounts of space. Furthermore, while video cameras effectively capture images for use by particular systems, these same cameras tend to make customers uneasy. When cameras exist, people clearly know they are being monitored thus creating some level of tension.

Additionally, many of the above mentioned systems are clearly meant for tracking individuals as they move about a predefined space. In this context, methodologies and systems are required to perform this detailed tracking. Consequently, the processes are much different than those aimed simply at "counting" the passage of people. Lastly, these systems all require large amounts of processing, which is not easily placed within an on-board processor. Such processing requirements necessitate large amounts of memory and very expensive high speed processors.

Also, previous systems are not well adapted to bus architectures wherein small discreet count sensors are placed at various locations and are connected to a larger system via bus connections.

SUMMARY OF THE INVENTION

The present invention allows for easy and efficient monitoring of people as they enter and exit certain predefined areas. For example, an entrance to or exit from a retail shopping outlet can be easily monitored to determine the flow of traffic into and out of the store. This information can then be used to monitor specific traffic flows and traffic patterns, as well as present marketing information to the store managers. For example, a store manager can monitor the flow of traffic as a consequence of specific advertising or sales activities and develop some measure of success for these activities. Such information can prove to be invaluable when operating a retail establishment or other facility of any type.

The system of the present invention is both efficient and small in size thus easily concealed from the consumers. This way, the consumer will not even be aware that they are being counted. Furthermore, the system is easily implemented without the need to custom make expensive parts and products.

The system of the present invention includes a count sensor which includes an image sensor, a frame grabber and suitable processing devices to process the captured images. In summary, the present invention operates by acquiring consecutive images at a regular time interval. Each of these images are digitized and stored in memory. From two consecutive images, a difference array is created whereby the digital image at the first point in time ($t_1$) is subtracted from the digital image at the second point in time ($t_2$) to determine any pixels which have changed. If no objects have moved in the field of view between time $t_1$ and time $t_2$, this image array will be empty. If this condition occurs, the system stops processing at that point and returns back to the beginning where it will retrieve a next set of consecutive images. If differences are found, the system of the present invention must then determine if these differences are significant.

In the next cycle, the system will again determine a difference array utilizing the next set of images. Using the above example, the difference array is then determined using the new image at ($t_3$) and the previous image (at $t_2$).

The system minimizes the subsequent processing and achieves better motion detection by performing a blocking function on the difference array. Blocking creates a plurality of "super pixels" or "cells". The system can then process the image using cells, thereby reducing the overall system processing necessary to achieve the desired counting function. Each of these cells are made up of a plurality of pixels. Each cell is designated as "changed" when a certain threshold number of individual pixels within the cell have changed. Processing is then done on each cell to create a "cell difference image" for the entire display image.

In addition to the above mentioned processing benefits, better detection is achieved through the aforementioned blocking. The present system looks for changes in pixels from frame to frame. By blocking the image, the probability of motion detection is increased. As mentioned, if a certain threshold number of pixels have changed, the entire cell is considered to have changed or to be active. By having a low threshold, the likelihood of a cell showing motion is greatly increased. Subsequently, when "blob analysis" is done on these cells to determine the existence of objects, a more consistent result is achieved. If this analysis was done on each pixel, it is likely that no movement would be detected due to the disjointed and inconsistent collection of changed or active pixels. Also, this analysis would fail due to breaks in the outline of the moving object because portions of the object may match the background of the image and would not register as motion.

To further provide efficient detection of objects, the system utilizes a variable threshold when creating its difference array. Initially, an absolute difference between the samples at time $t_1$ and time $t_2$ generated. This absolute difference creates an indication of the difference in intensity between the two pixels. This difference in intensity is then compared to a variable threshold to determine whether the pixel should be designated as changed. This variable threshold is dependent upon the brightness of the pixels. Therefore, a much greater threshold is used for brighter pixels whereas a lower threshold is used for dim pixels. This use of variable thresholds results in a system that is better capable of detecting motion over a wide variety of lighting conditions.

To further minimize the processing necessary, the system of the present invention designates a "crop box" which is a predefined area of the image. All objects discovered outside of this box are consequently disregarded while images within the crop box are fully processed.

Upon completion of the blocking and crop box creation, the system of the present invention performs a "blob analysis" whereby areas of changed pixels are analyzed. This analysis provides for the identification of objects within the designated crop box. Once an object is discovered, its coordinates are noted and it is compared with a historical object list. If no correlation is found between the historical object list and the new object, the discovered object is marked as a new object. For each new object, the identity and original coordinates are stored in memory. Following the storage of information, the invention returns back to the beginning of the process where a new image is acquired.

Where correlation is found between historical objects and the discovered objects, these objects are noted as historical objects and their progress is tracked. This progress is used to determine if the object should be counted or not.

If the progress of a historical object is determined to be above a predetermined threshold, the object and its direction are recorded. Included in the stored object data are the specific time and direction of the object. This storage in memory results in the product being "counted" and appropriately recorded. The system of the present invention records the exact time of the count as well as its direction (e.g. in or out). Therefore, complete records and history of traffic for any given time period can easily be recalled and used for any number of management purposes.

The count sensor of the present invention, as previously described, can be used either singularly or in a network. In this configuration, a plurality of count sensors, each including their own processing capabilities, can be used in conjunction with one another to monitor a plurality of entrances or passageways.

It is an object of the present invention to create a small, efficient count sensor which is capable of counting traffic as it traverses a predefined area. In one application, this predefined area is an entrance to a retail establishment of some type.

It is a further object of the present invention to create a system which not only counts the number of people traversing the predefined area, but also to provide detailed information regarding the direction of travel and the exact time when this particular count occurred. The acquisition of this information is thus available to further processing systems to analyze the flow of customers and people over any predefined period of time.

It is an object of the present invention to create a system which efficiently processes the required information to perform counting of people or objects. In such operations, an appropriate level of resolution is utilized which is capable of efficiently counting all desired objects without over-processing information. Consequently, appropriate tradeoffs are made between resolution and processing loads.

It is a further object of the present invention to create a people counting system which is efficient and can store large amounts of data regarding the flow of people.

BRIEF DESCRIPTION OF THE DRAWINGS

Further objects and advantages of the present invention can be seen by reading the following detailed description in conjunction with the drawings in which.

DETAILED DESCRIPTION OF THE INVENTION

Figure 1:
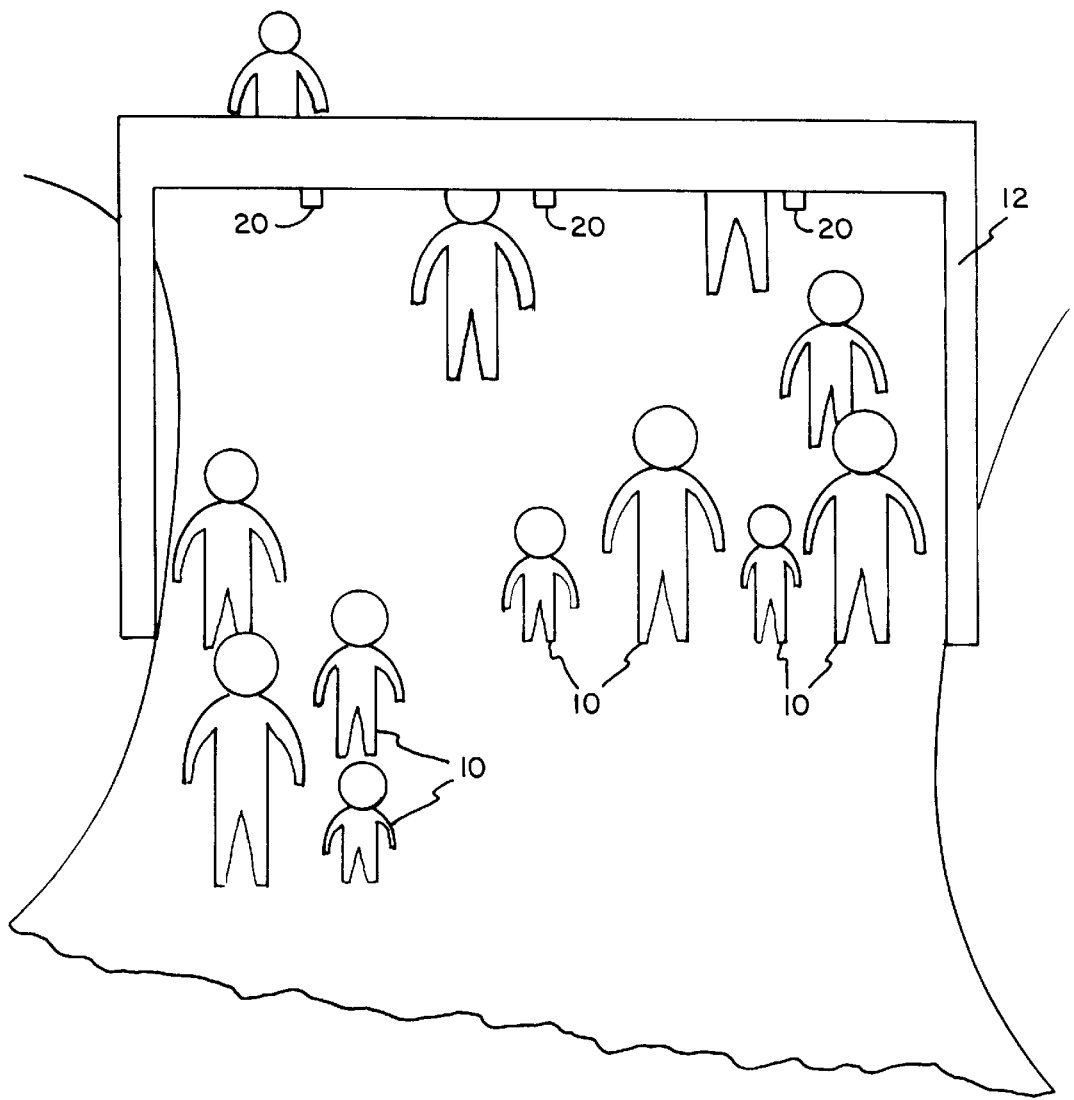
FIG. 1 is a perspective diagram showing the entrance to an establishment which illustrates the invention as used in one particular application.

Referring now to FIG. 1, there is shown an illustration of the present invention in use. As can be seen from this illustration, a plurality of individuals or people 10 are all progressing through an entrance or gate 12 into some type of establishment. For example, gate 12 could be an entrance to an amusement park, a retail establishment, or any other facility which caters to the public. Attached to an upper portion of gate 12 are a plurality of count sensors 20. Each of these count sensors are utilized to maintain records of the people entering or exiting the designated area. More specifically, the count sensors 20 are utilized to count the people entering or passing through gate 12 and record information related to this flow of individuals. As will be seen more fully in the following description, count sensors 20 are capable of counting individuals and recording detailed information regarding these individuals. Specifically, the time at which they passed the respective sensor and the direction of travel are all recorded. As previously discussed, this sensor information is very useful to the management of such establishments to measure and forecast the flow of traffic into and out of the establishment. Furthermore, this information can be used to assess the results of certain marketing efforts or special events.

Figure 2:
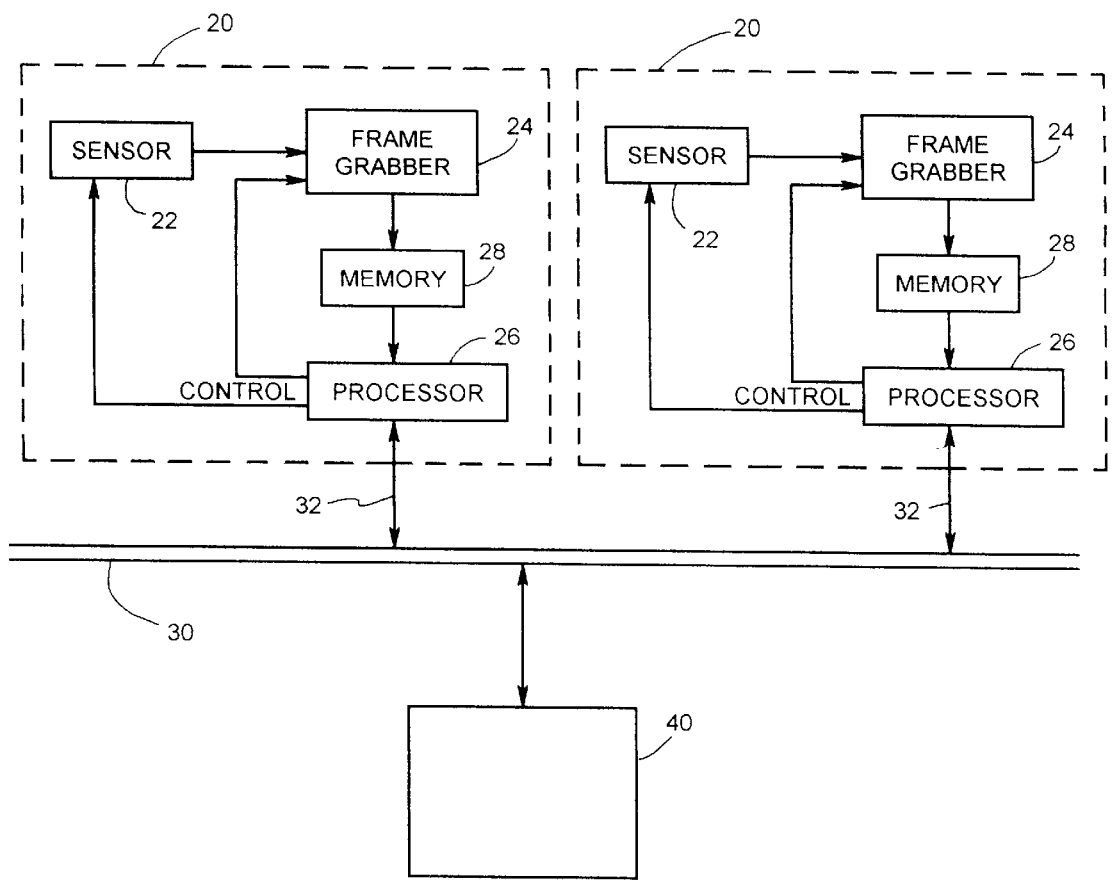
FIG. 2 is a schematic drawing showing the elements of the present invention.

Referring now to FIG. 2, there is shown a schematic diagram of the components of the present invention. Shown in FIG. 2 are two count sensors 20 which are attached to a communications bus 30. Also attached to communications bus 30 is a host computer 40. While there are two count sensors 20 shown in the illustration of FIG. 2, it is understood that any number of count sensors could be attached to communications bus 30, each of which are capable of communicating via communications bus 30 to host computer 40. It is also understood that communications bus 30 could take on any common configuration of communications device such as an RS-485 bus. In this configuration, host computer 40 could easily communicate with any single count sensor 20 to retrieve information stored by the individual count sensors 20.

Count sensor 20 includes a number of parts which enable it to carry out its desired function. More specifically, count sensor 20 includes an optical sensor 22, a frame grabber or digitizer 24, a processor 26 and memory element 28. As can be seen in more detail in FIG. 2, optical sensor 22 is connected to both frame grabber 24 and processor 26. Additionally, frame grabber 24 is also connected to processor 26 and frame grabber 24. Also included in count sensor 20 is a memory 28 which is also connected to processor 26. As will be understood by those skilled in the art, these are components which are connected together to easily perform their desired functions. As will be further understood, most operations are directed by processor 26; however, each device naturally has its own capabilities.

Count sensor 20 is connected to communications bus 30 via a bus connection 32. This bus connection is attached internally to processor 26. As again will be understood by those skilled in the art, count sensor 20 may also include a separate I/O interface (not shown in FIG. 2) to handle communications with bus 30. Alternatively, this operation could be carried out by processor 26. As previously mentioned, there are two count sensors shown in FIG. 2. While it is understood that these are identical in their configuration and operation, they do each contain unique bus addresses to allow communications by host computer 40.

In the present invention, optical sensor 22 could include many different devices which are capable of retrieving an optical image and transferring it on to further devices. One obvious choice is a typical video camera. The use of a video camera is not ideal, however, because of size considerations. A more desirable device is a two-dimensional light sensitive array. In summary, it is necessary for the optical sensor 22 to simply retrieve the image desired and transfer it to a subsequent device for further processing.

Figure 3:
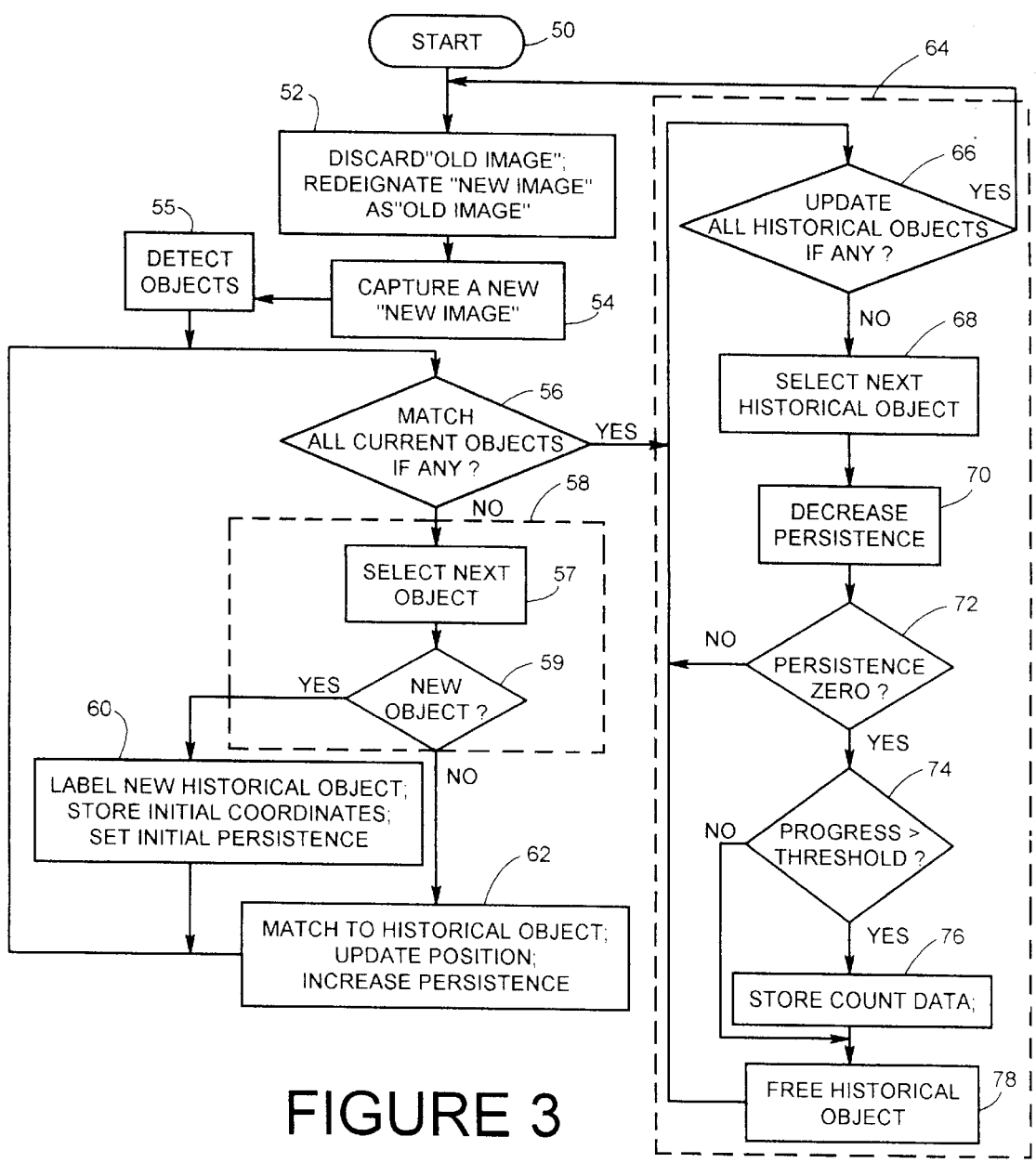
FIG. 3 is a flowchart outlining the basic steps carried out by the system of the present invention when counting people.

Referring now to FIG. 3, there is shown a flowchart outlining the steps carried out by the present invention to achieve its desired counting result. As this process is carried out, specific references will be made to the devices of FIG. 2 so as to fully describe both the functional operation and the component interrelationship of the present invention.

Referring now more specifically to the flowchart of FIG. 3, at start point 50, the present invention initiates its analysis operations. The system of the present invention continuously captures images at a predetermined interval. Each of these images are digitized and stored in memory for further processing. Therefore, in one cycle of the process, the system will capture an image at time $t_1$, and on a subsequent cycle the system will capture an image at time $t_2$. Consequently, at the start of its processing, the system will have a baseline image (image at time $t_1$) in its memory for use in processing. The system initially, in its image designation step 52, will designate the most recent image as the "old image" for further processing. As will be understood by those skilled in the art, this is simply a juggling of images stored in memory for use in processing so that the present system is capable of operating in real time.

Next, the system captures a "new image" (i.e. image at time $t_2$) for use in detecting objects. As will be recognized by those skilled in the art, optical sensor 22 and frame grabber 24 are required to carry out the two capture image steps 52 and 54. More specifically, a continuous image is transmitted from optical sensor 22 to frame grabber 24. When initiated by processor 26, frame grabber 24 will freeze the image and convert it to a digital signal. This digital signal is then temporarily stored as the image present at that particular time (e.g., at time $t_1$). Similarly, at a subsequent point in time, frame grabber 24 will again freeze or capture an image at a second point in time (e.g., at time $t_2$) and provide that image in a digital format to an output. Obviously, both of these images are received by processor 26 for further operations.

Next, in object detection step 55, the process of the present invention analyzes the two captured images to determine whether there are currently any moving objects. Further information regarding this step will be found in the later discussion involving FIG. 4. The system is capable of detecting and tracking multiple objects at the same time moving in any direction. Therefore, the steps described may need to be repeated for each object. In object matching step 56, all identified objects are compared with a list of historical objects. If an object is found that does not match an historical object, the process moves on to step 58 where the system determines whether the selected object is new or not. Initially, in object detection step 58, the system selects in step 57 the next current object to be matched and then moves on to determination step 59 wherein it is determined whether this is a new object or not. If it is determined that this is a new object, the system moves on to step 60 wherein the new historical object is labeled, its initial coordinates are stored, and its initial persistence value is established.

As will become further obvious reading the following description, each object maintains a persistence value over time. Utilizing this persistence value allows the system to track objects which may stop while in the field of view. The persistence value allows for these objects to be stored in memory for a certain period of time so that they can be easily detected when movement begins once again.

Alternatively, if in step 59 it is determined that the selected object is not a new object but is actually a historical object, the system moves on to step 62 wherein the selected object is matched to a historical object and the position and persistence of this historical object are updated. Following either label new object step 60 or match historical object step 62, the system loops back to steps 56 to determine if all current objects have been matched. Assuming all current objects have been matched (i.e. have been identified and stored as new objects or have been updated as historical objects), the system then moves on to step 64 to determine if the object should then be counted.

The first step in count object step 64 is to determine if all historical objects have been updated. In the case where newly detected objects have been discovered or historical objects have just been recently updated (in steps 60 and 62), the process will determine that these objects have been recently updated in update determination step 66 and will cause the system to loop back to the beginning of its process.

However, in the situation where the process does not determine the identified objects are new (the object may have stopped in the image field or the object has passed through the image field), update determination step 66 will conclude that all historical objects have not been updated (or no movement of objects occurred) and will move on to selection step 68. In this step, each historical object is selected and the persistence value for this historical object is decreased in decreased persistence step 70. Next in persistence evaluation step 72, the system evaluates the persistence value for each object. If the persistence is greater than zero, the system will loop back to step 66, thus causing update determination step 66 to conclude, with respect to the recently evaluated object, that it has been updated and consequently loop back to the beginning of this process. If the persistence value is equal to zero, persistence evaluation step 72 causes the system to move on to progress evaluation step 74 wherein the progress of the object is evaluated. If in progress evaluation step or determination step 74 the system determines that the object has traversed or moved a distance greater than a threshold value, the system moves on to count step 76 wherein the count data is stored. Next, in step 78, the historical object is freed or released. Consequently, this object will not be stored in memory any longer as a historical object nor will an attempt be made to track this object. Following count step 76 the process then moves back to step 66 to evaluate all objects. Alternatively, if in evaluation step 74 it is determined that sufficient progress has not been made, the process simply moves to step 78 wherein the historical object is released.

In summary, the system of the present invention tracks objects for as long as possible. When an object can no longer be tracked, the system allows the persistence value to decrease to zero and then evaluates the progress of that object. If the progress is greater than a threshold value, the system will then determine the direction of the object and will store that information as a count. Further information regarding object detection step 55 will be provided in relation to FIG. 4.

Figure 4:
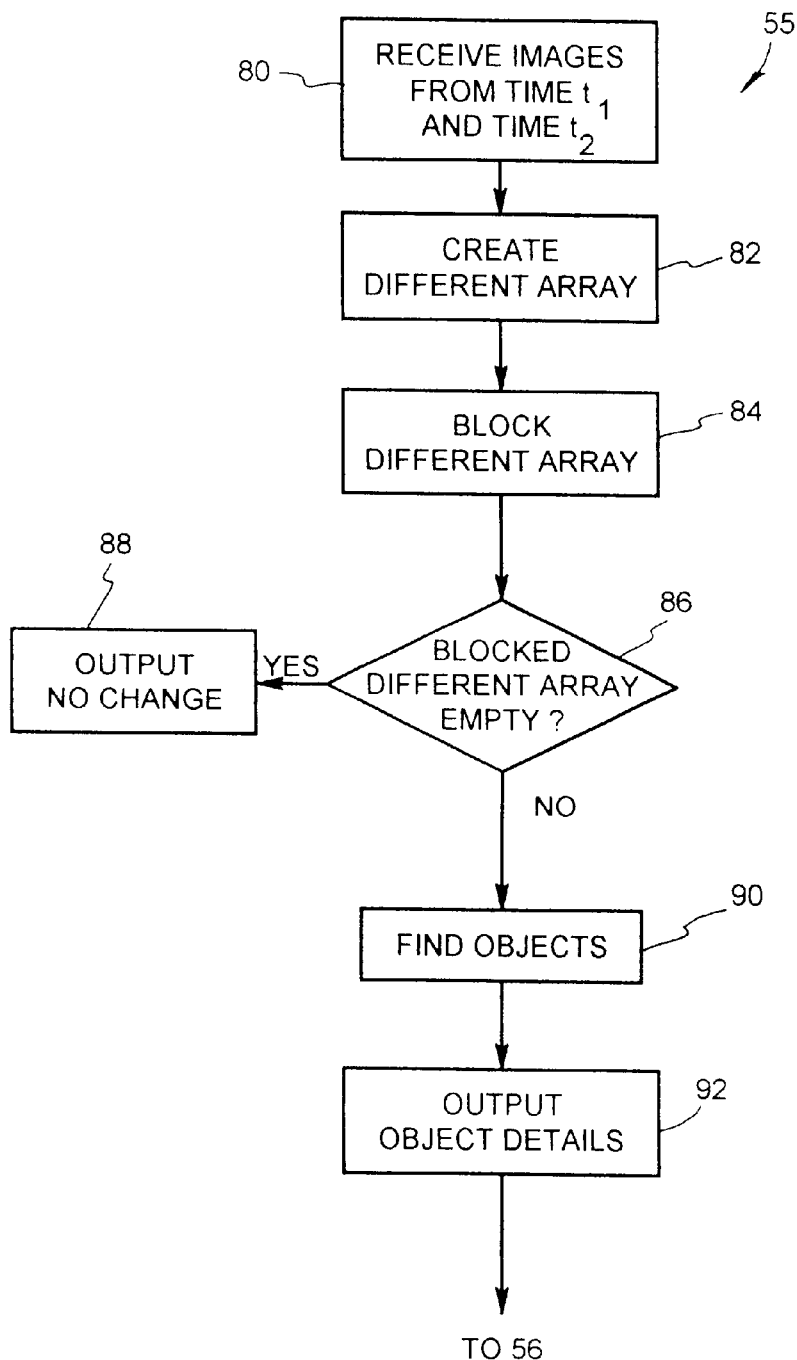
FIG. 4 is a flowchart illustrating the steps taken by the system of the present invention to locate objects within the image field.

FIG. 4 provides an illustration, in further detail, of object detection step 55. To begin this new object determination step, the images from $t_1$ and $t_2$ are received at step 80. As previously mentioned, these two images are received in a digital format from frame grabber 24. After receipt of these two images, a difference array is created in step 82. The difference array is created by subtracting the two pixel arrays being analyzed (the array at time $t_1$ and the array at time $t_2$). This operation creates an absolute difference between the two samples. This absolute difference is then compared to a threshold to determine if the pixel should be marked as changed or unchanged. As previously mentioned, this threshold is a variable quantity that depends on the brightness of the two pixels being compared. Generally speaking, this threshold is in the following equation:

threshold=fixed-portion+K*maximum ($S_1$, $S_2$)

Fixed-portion is a relatively small value to ensure that ambient noise will not affect the system. The term "maximum ($S_1$, $S_2$)" is simply a variable to denote the higher of the two intensity values. "K" is a constant utilized to scale the appropriate threshold. In one embodiment of the present invention, K is set to 0.25 wherein the intensity ranges S can range from zero to 255. As can be seen, the threshold is much greater for higher intensity pixels than it is for lower intensity or dimmer pixels.

If it is determined that the change in pixel intensity is above the aforementioned threshold, then the pixel is marked as changed. Alternatively, if the change in intensity is below this threshold value, the pixel is marked as unchanged.

Next, in step 84, the image is "blocked". More specifically, this blocking step allows for a reduced processing load and maximized resolution of the image screen. In this blocking step, a plurality of "cells" are established, each having a predetermined size. For example, each cell could be made up of a square configuration of 16 pixels (4 pixel×4 pixel array). The purpose of this blocking step is to therefore reduce the number of blocks or elements which must be analyzed when dealing with the difference image. Additionally, the blocking operation creates additional sensitivity for the system. As previously mentioned, small changes in a block will cause that entire block to be marked as changed therefore providing the system with a better opportunity to further analyze each object. As detection of motion is the overall goal of the present invention, and not identification of a person or object, any loss in resolution is minor and overcome by the enhanced detection capabilities.

The present invention also uses a threshold limit within this blocking step to determine if the changes in the difference array are legitimate. In one example of the present invention, using a 4×4 pixel array for each cell, if three of the 16 pixels have changed, the entire block is marked as being changed. Alternatively, in this same example, if less than three pixels have changed, the block is marked as having no change. After this blocking step has been completed, all further processing is done on a cell basis as opposed to a pixel basis. This process clearly reduces the amount of processing necessary to determine the presence of objects. The downside of this "blocking step" is that the system sacrifices some resolution in the images evaluated. This loss of resolution, however, does not affect the performance of the product as the objects being measured are considerably larger than any of the particular cells.

Following the blocking of the difference array in step 84, the present system determines whether the blocked difference array is empty or not. Obviously, if the blocked image array is empty, no significant changes have occurred in the image field and consequently no further image processing is necessary. Therefore, if blocked difference array evaluation step 86 determines that the array is empty, the process of the present invention moves on to no change output step 88 wherein it is indicated that no change in the difference array has occurred and no further image processing is necessary. Once this output is produced, the system will proceed through step 56 to the update historical objects step 64 as shown in FIG. 3.

Figure 5:
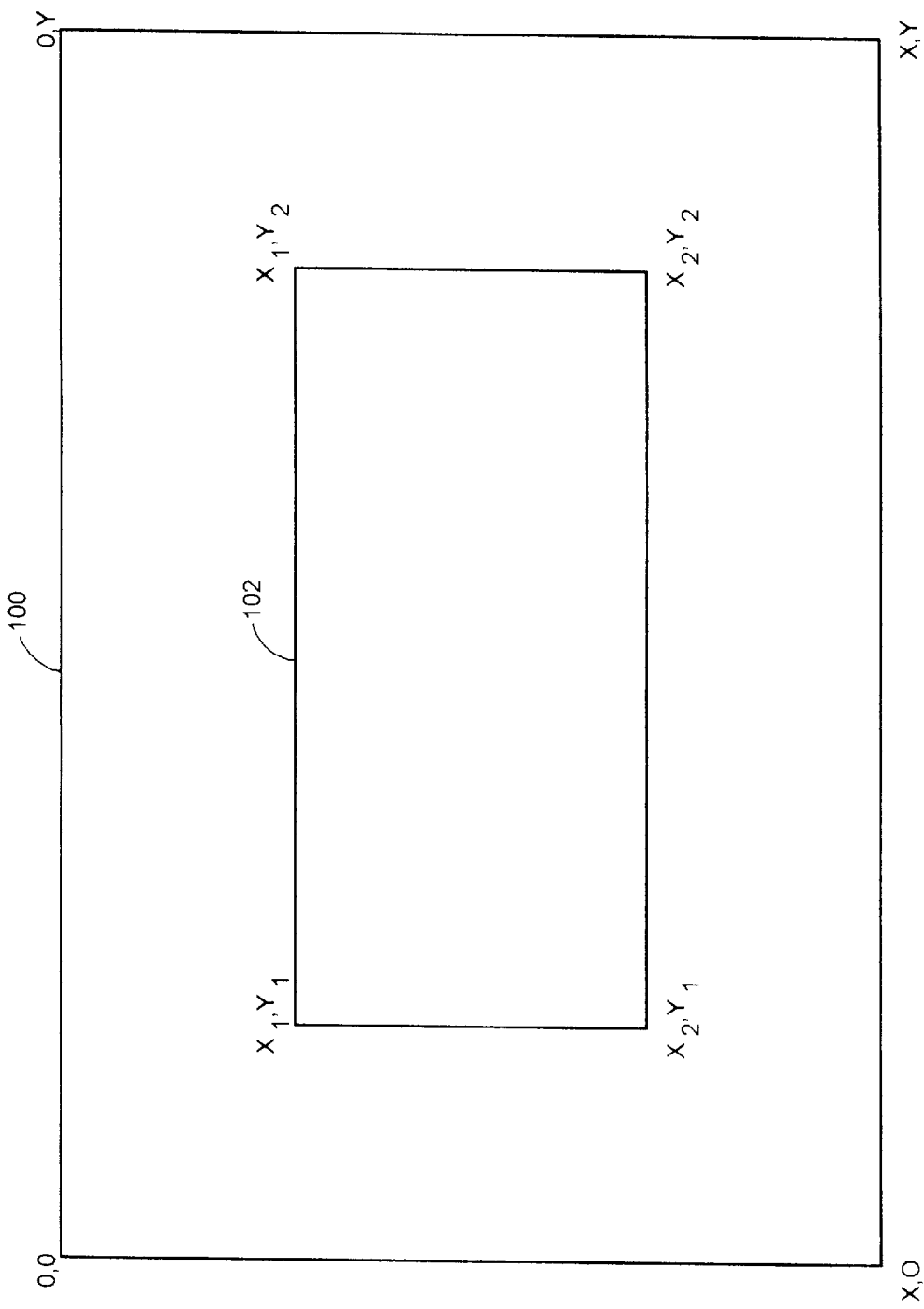
FIG. 5 is an image illustration showing the image field as a whole and the use of a crop box to further minimize processing by the present invention.

As shown in FIG. 4, if the blocked difference array determination step 86 determines that the blocked image array is not empty, i.e., significant differences have occurred, the process moves on to find objects step 90. Within find object step 90, the first activity carried out is the reduction in the image field size. Referring now to FIG. 5, there is shown a pixel grid of the image field. After the image field has been blocked, the image field will consist of an array of cells. Using cell coordinates, this array can consist of a rectangular block being Y cells wide and X cells high. This is shown in FIG. 5 as image field 100. In an effort to further reduce the processing required by the system of the present invention, a crop box 102 is created within image field 100. This crop box is established substantially in the center of image field 100 so as to capture the critical portion thereof. Obviously, crop box 102 will have opposite diagonal coordinates $X_1$, $Y_1$, and $X_1$ and $Y_2$.

The system of the present invention utilizes an optical sensor which produces an image 320×200 pixels. Using the aforementioned blocking routine, this is reduced to an image of 80×50 cells. Obviously, this blocking, as previously mentioned, creates a significant reduction in the processing necessary for the present invention. Therefore, using cell coordinates, image field 100, as shown in FIG. 5, have coordinates such that X=49 and Y=79 (i.e., an array 80 cells wide by 50 cells high). The corresponding crop box 102 utilized is consequently an array which is 40 cells wide and 20 cells high. In this example, $X_1$=15, $X_2$=35, $Y_1$=20 and $Y_2$=60. All further processing by the system of the present invention will disregard all images outside of crop box 102, thereby once again considerably reducing the amount of processing necessary to perform the functions of the present invention.

All of the previously mentioned array values are stated for illustrative purposes only. It is clearly understood by those skilled in the art that different values could be used to achieve the desired goals of a particular application.

Referring again to FIG. 4, find objects routine 90 obviously analyzes the difference array to determine the presence of objects and to provide further information related thereto. More specifically, this step will perform a traditional blob analysis on the difference array to determine the coordinates of each discovered object. More specifically, these coordinates will include the height and width of the object, along with the coordinates of the object's center. Once again, all of these operations are done using cell coordinates and not pixel coordinates, which consequently eases the processing load. Next, once this analysis is done and find objects step 90, the system moves on to output step 92 to provide the relevant information (height, width, center coordinates, etc.) for each discovered object. Following this step, as shown in FIG. 3, the process then moves on via step 56 and step 57 to determine if new objects are present in new object determination step 58. Step 56 is simply a program flow switch that directs the process to the update historical object step 64 when all current objects have been matched.

Figure 6:
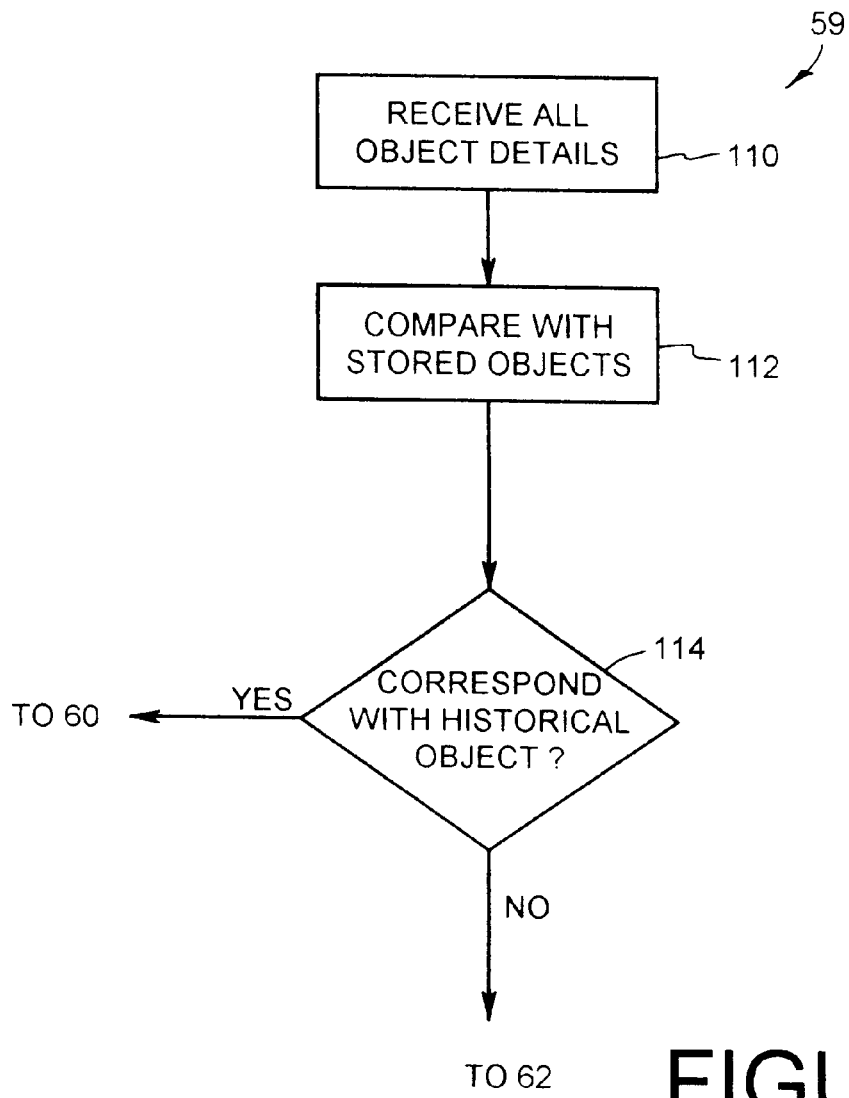
FIG. 6 is a flowchart which illustrates the steps of the present invention which are carried out to determine if new objects are discovered.

Referring now to FIG. 6, there is shown more detail regarding the new object determination step 59. Initially in step 110, all of the object details are received. Obviously, these object details are received from output object step 92 via program flow step 56 and object selection step 57. In compare object step 112, the system compares all of the received object details with active historical objects. The purpose of this step is to determine whether the objects identified in the previous step are new objects within the crop box or are objects that have previously been identified and have simply moved some distance. This step is carried out by comparing the object details identified (height, width, center, coordinates) with the same information stored on historical objects. If there is correlation between any historical objects stored in memory, the object is identified as an existing "historical object". Alternatively, if no correspondence is determined, the object is identified as a new object.

Referring now specifically to FIG. 6, in correspondence step 114, this exact determination is made to identify historical objects. If it is determined that the examined object corresponds with a historical object, the system moves on to update historic object data step 62. This update includes the storage of the object's characteristics along with its new coordinates. However, if no correspondence exists between the examined object and a historical object, the process moves on to store new object data step 60 wherein the object is identified as a new object and stored as such along with its relevant information (height, width, original coordinates). Correlation between discovered objects and historical objects is accomplished by comparing the determined center of the object with the most recently stored historical center of the object. If this distance is below a threshold level, a match is determined between the historical object and the discovered object. This distance is set depending on the installed height of the sensor.

When analyzing objects, a blob analysis is done. In the process of accomplishing this analysis, certain minimum and maximum values are compared against each object's length and width. In this way, small objects or children can be rejected by the system and will accordingly not be counted. Similarly, using a maximum value allows for the determination of multiple people occupying space in close proximity to one another. If the width of an object is above this maximum, the object will be split into two objects. Subsequently, this will be treated and processed as two separate objects by the system.

Referring back to determine object correspondence step 114, it is noted that the system of the present invention includes the aforementioned persistence to track objects which stop within the image field. For example, if a person were to enter the image field and then stop for some period of time, their image would not be detected when the aforementioned difference array is created. In order to account for this realization, the present invention includes a persistence factor which stores all historical objects for a predetermined period of time. Therefore, when the object begins to move again within this predetermined period of time, the system will easily recognize this object as a historical object and accordingly track that object. However, to insure that memory resources are efficiently used, if the object does not reappear within a predetermined time, this object is dropped from memory and consequently will not be counted if it has not achieved sufficient progress. This situation could occur possibly should, for example, a piece of debris be dropped within the image field and caused to remain there for some extended period of time. Clearly, the present system would not want to count such an object.

Figure 7:
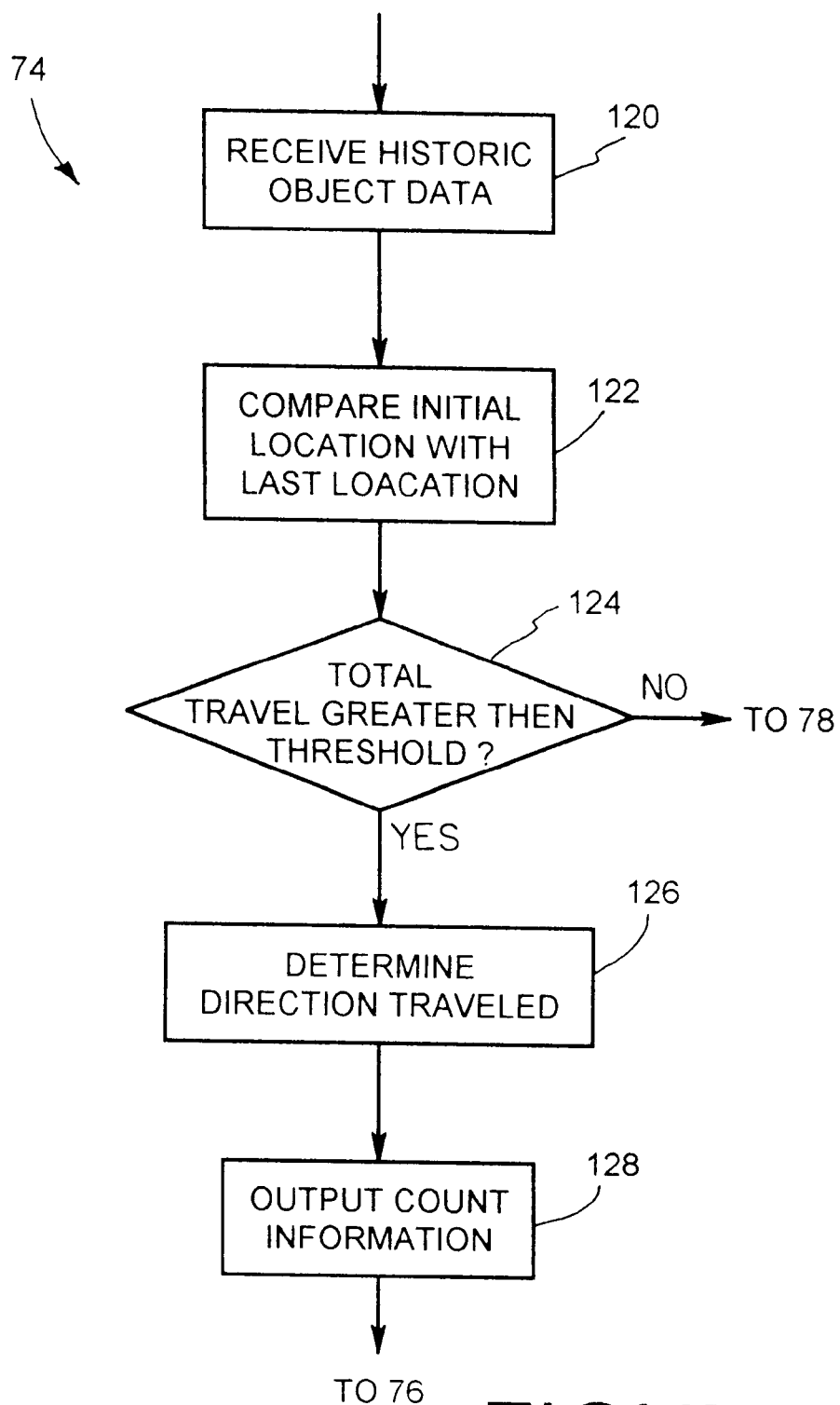
FIG. 7 is a flowchart illustrating the steps taken by the present invention to track objects as they traverse the crop box and to determine if the object should be counted.

Referring now to FIG. 7, there is shown further detail of the "count object step" 74. As previously stated, this is the step within which it is determined whether or not the object being analyzed should be counted. This process begins at received object data step 120 wherein all information regarding the objects being analyzed is received. Once again this information includes the coordinates where the object was first identified, and the most recent (last) location for this particular object. Next, in comparison step 122, the initial location of the object is compared with its current (last) location. The purpose of this step is to determine the progress the object has made in traversing the crop box. Next, in progress analysis step 124, the system determines whether the progress of the object is above a predetermined threshold. If the object has traversed this predefined distance within the crop box, the system then determines that this object should be counted and moves on to direction determination step 126. Obviously, this direction will be one of two possibilities—either in or out. After the direction traveled has been determined, the process moves on to output step 128 where the count information is output to the system for storage. As previously mentioned, this information includes the direction traveled and the specific point in time at which the object traversed the image field. After this count, the historical data related to this object is dropped in step 78 as the object has been counted and is therefore irrelevant.

Moving back to the progress analysis step 124, if it is determined that the progress made by the object is not sufficient for counting, the system moves on to free historical object 78 where the historical object data is dropped and the system then returns to its starting point once again.

The aforementioned system has been described in the context of tracking individuals or people as they pass through some predefined area. The predefined area then includes a number of sensors which are used for this identifying and tracking operation which are small in size and undetectable by the individuals being counted. It is clearly understood by those skilled in the art that the present invention could be used to track and count any number of different objects. For example, this same system could be utilized to count and track objects as they progress through a manufacturing process. Also, this system may be utilized to track traffic as it progresses through some predefined area.

Having illustrated and described the principles of the invention in the preferred embodiment, it should be apparent to those skilled in the art that the invention can be modified in arrangement and detail without departing from such principles. We claim all modifications coming within the scope and spirit of the following claims.

It is claimed:

1. A tracking apparatus for sensing and tracking the movement of objects in a controlled space, comprising:

sensing means positioned adjacent to the controlled space for monitoring the controlled space and producing an image signal indicative of the condition of the controlled space;

digitizing means attached to the sensing means for receiving the image signal and producing a digitized video signal indicative of the condition of the controlled space;

processing means for receiving the digitized video signal and processing the digitized video signal so as to track the movement of objects in the controlled space, wherein the processing of the digitized signal comprises:

(a) processing a first image and a second image to determine the position of objects in the controlled space, wherein the first image is representative of the condition of the controlled space at a first point in time and the second image is representative of the condition of the controlled space at a second point in time, the position of objects is determined by calculating a difference array between the first image and the second image and identifying those portions of the controlled space that have changed;

(b) blocking the difference array to increase the sensitivity of the system and producing a blocked difference array;

(c) identifying a primary region within the image;

(d) identifying objects present in the primary region based upon the blocked difference array and tagging each object with an identifier;

(e) tracking each object as it traverses the primary region and recording count information once the object has moved a predetermined distance within the primary region.

2. The system of claim 1 wherein the first image and the second image are made up of a plurality of pixels and the difference array is made up of a plurality of pixels difference values.

3. The system of claim 2 wherein the blocking step is accomplished by identifying a plurality of adjacent pixels as a cell and identifying each cell as changed if a predetermined number of pixels have sufficiently changed.

4. The system of claim 3 wherein each pixel is marked as changed if the pixel difference value is above a predetermined level.

5. The system of claim 3 wherein the pixel difference value is equal to the difference between corresponding pixels in the first image and the second image and each pixel is marked as changed if the pixel difference value is greater than a predetermined constant plus a predetermined percentage of the greater pixel value of the first image or the second image.

6. The system of claim 3 wherein each cell comprises a square arrangement of 16 pixels.

7. The system of claim 5 wherein the predetermined number of pixels is equal to 3 pixels.

8. A tracking apparatus for sensing and tracking the movement of objects in a controlled space, comprising:

a sensing device positioned adjacent to the controlled space for monitoring the controlled space and producing an image signal indicative of the condition of the controlled space;

a digitizing device coupled to the to the sensing device for receiving the image signal and producing a digitized video signal indicative of the condition of the controlled space;

a processing device coupled to the digitizing device for receiving the digitized video signal and processing the digitized video signal so as to track the movement of objects in the controlled space, wherein the processing of the digitized signal comprises:

(a) processing a first image and a second image to determine the position of objects in the controlled space, wherein the first image is representative of the condition of the controlled space at a first point in time and the second image is representative of the condition of the controlled space at a second point in time, the position of objects is determined by calculating a difference array between the first image and the second image and identifying those portions of the controlled space that have changed;

(b) blocking the difference array to produce a blocked difference array;

(c) identifying a single, contiguous primary region within the image;

(d) identifying objects present in the primary region based upon the blocked difference array and tagging each object with an identifier;

(e) tracking each object as it traverses the primary region and recording count information once the object has moved a predetermined distance within the primary region.

9. The system of claim 8 wherein the first image and the second image are made up of a plurality of pixels and the difference array is made up of a plurality of pixel difference values.

10. The system of claim 9 wherein the blocking step is accomplished by identifying a plurality of adjacent pixels as a cell and identifying each cell as changed if a predetermined number of pixels have sufficiently changed.

11. The system of claim 10 wherein each pixel is marked as changed if the pixel difference value is above a predetermined level.

12. The system of claim 10 wherein the pixel difference value is equal to the difference between corresponding pixels in the first image and the second image and each pixel is marked as changed if the pixel difference value is greater than a predetermined constant plus a predetermined percentage of the greater pixel value of the first image or the second image.

13. The system of claim 10 wherein each cell comprises a square arrangement of 16 pixels.

14. A tracking apparatus for sensing and tracking the movement of objects in a controlled space, comprising:
- a sensing device positioned adjacent to the controlled space for monitoring the controlled space and producing an image signal indicative of the condition of the controlled space;
- a processing device coupled to the sensing device for receiving and processing the image so as to track the movement of objects in the controlled space, wherein the processing of the image comprises:
    (a) processing a first image at a first point in time and a second image at a second point in time and subsequently calculating a difference array;
    (b) blocking the difference array to produce a blocked difference array;
    (c) identifying a single, variable primary region within the image, wherein the primary region is variable from substantially the entire image to a substantial fraction of the whole image;
    (d) identifying objects present in the primary region based upon the blocked difference array and tagging each object with an identifier;
    (e) tracking each object as it traverses the primary region and recording count information once the object has moved a predetermined distance within the primary region.

15. The system of claim 14 wherein the first image and the second image are made up of a plurality of pixels and the difference array is made up of a plurality of pixels difference values.

16. The system of claim 15 wherein the blocking step is accomplished by identifying a plurality of adjacent pixels as a cell and identifying each cell as changed if a predetermined number of pixels have sufficiently changed.

17. The system of claim 16 wherein each pixel is marked as changed if the pixel difference value is above a predetermined level.

18. The system of claim 16 wherein the pixel difference value is equal to the difference between corresponding pixels in the first image and the second image and each pixel is marked as changed if the pixel difference value is greater than a predetermined constant plus a predetermined percentage of the greater pixel value of the first image or the second image.

19. The system of claim 16 wherein each cell comprises a square arrangement of 16 pixels.

20. The system of claim 18 wherein the predetermined number of pixels is equal to 3 pixels.

* * * * *

UNITED STATES PATENT AND TRADEMARK OFFICE
CERTIFICATE OF CORRECTION

PATENT NO. : 5,973,732
DATED : October 26, 1999
INVENTOR(S) : Thomas C. Guthrie

It is certified that error appears in the above-indentified patent and that said Letters Patent is hereby corrected as shown below:

Col. 12, line 18, delete the first phrase "to the" after the word coupled.

Signed and Sealed this

Third Day of April, 2001

Attest:

NICHOLAS P. GODICI

*Attesting Officer*   *Acting Director of the United States Patent and Trademark Office*